United States Patent Office 3,840,502
Patented Oct. 8, 1974

3,840,502
THERMOSETTING DIALLYL METHYLPHTHALATE RESINS AND PROCESS FOR THEIR PREPARATION
Kiyokazu Tsunawaki, Katsuhisa Watanabe, Shigeru Sasama, Yuzo Aito, and Kiyoshi Nawata, Tokyo, Japan, assignors to Teijin Limited, Osaka, Japan
No Drawing. Filed Oct. 10, 1972, Ser. No. 296,015
Int. Cl. C08f 15/16
U.S. Cl. 260—78.5 UA                    9 Claims

ABSTRACT OF THE DISCLOSURE

A thermosetting diallyl methylphthalate resin having improved thermal stability and chemical resistance comprising at least 70 mol percent of structural units derived from a monomer selected from the group consisting of diallyl methylisophthalate and diallyl methylterephthalate and not more than 30 mol percent of structural units derived from a compound selected from the group consisting of 1,2-polybutadiene, vinyl compounds, and allyl esters of mono- or poly-basic acids other than said monomers.

---

This invention relates to a novel thermosetting resin and a process for its preparation. The thermosetting diallyl methylphthalate resins of this invention have markedly improved thermal stability and chemical resistance as compared with the known thermosetting diallyl phthalate resins and superior electrical and mechanical characteristics comparable to those of the known diallyl phthalate resins.

It has previously been known to provide thermosetting diallyl phthalate resins by polymerizing diallyl esters of dibasic acids such as diallyl terephthalate, diallyl isophathalate or diallyl ortho-phthalate. In order to provide desirable physical properties, a prepolymer is produced by reaction of diallyl phthalate in a first stage, and the prepolymer containing residual unsaturated bonds is polymerized usually in the presence of a peroxide catalyst in a second stage to form the thermosetting resins.

Since the diallyl phthalate resins have excellent thermal stability, electrical properties and mechanical properties, they find wide utility as decorative sheets or component parts of electrical communication devices. However, their use is limited because of their inferiority in chemical resistance, for example resistance to alkali hydrolysis.

Diallyl isophthalate resins having relatively good thermal resistance have the defect that prepolymers used for their production and molding materials based on these resins have extremely poor storage stability. As is well known, when a diallyl isophthalate prepolymer is stored for 6 months at room temperature in the absence of an initiator, its molecular weight increases to two to three times, and the flow characteristics of the prepolymer become extremely poor. When heated at 50° C., the prepolymer is partially gelled in several days and cannot be used as a cure molding material.

It has now been found that novel resins obtained by polymerizing diallyl esters of isophthalic acid or terephthalic acid containing methyl groups directly bonded to the aromatic ring have excellent electrical properties and mechanical properties the same as in the conventional diallyl phthalate resins and also possess markedly improved resistance to alkali hydrolysis, thermal stability and storage stability.

Thermosetting diallyl methylphthalate resins composed of structural units derived from a monomer selected from diallyl methylisophthalate and diallyl methylterephthalate have been totally unknown. We have found that these unknown resins have the excellent improved properties as described above as compared with the known thermosetting diallyl phthalate resins composed of structural units derived from diallyl phthalates.

It is therefore an object of this invention to provide a novel thermosetting diallyl methylphthalate.

Another object of this invention is to provide a thermosetting diallyl methylphthalate resin having the desirable electrical and mechanical properties of the known thermosetting diallyl phthalate resins and also having remarkably improved thermal stability and chemical resistance.

Still another object of this invention is to provide a process for preparing the novel thermosetting diallyl methylphthalate resins having the improved properties described above.

Many other objects and the advantages of the present invention will become apparent from the following description.

The thermosetting diallyl methylphthalate resins of the present invention can be prepared by polymerizing at least one member selected from the group consisting of:

(1) diallyl methylisophthalate,
(2) diallyl methylterephthalate,
(3) a homo- or co-prepolymer having residual unsaturated bonds which is derived from a monomer selected from the group consisting of diallyl methylisophthalate and diallyl methylterephthalate, and
(4) a co-prepolymer having residual unsaturated bonds composed predominantly of structural units derived from a monomer selected from the group consisting of diallyl methylisophthalate and diallyl methylterephthalate.

At this time, the above member may be copolymerized together with a minor amount, for example, not more than 30 mol percent, of a comonomer copolymerizable with said member to provide a thermosetting diallyl methylphthalate resin containing structural units derived from such a comonomer.

The diallyl methylisophthalate and diallyl methylterephthalate used in the present invention can be prepared by a method known per se. For example, they are prepared (a) by dehydrohalogenation of halogenides of methylisophthalic acid or methyl terephthalic acid and allyl alcohol, (b) by reaction of alkali metal salts of methyl isophthalic acid or methyl terephthalic acid with allyl halogenides, and (c) by ester-interchange reaction of lower alkyl esters of methyl isophthalic acid or methyl terephthalic acid using allyl alcohol. The methyl isophthalic acid and methyl terephthalic acid used here can also be prepared by a known method. Usually, they are prepared by oxidation of trialkylbenzenes, for example pseudocumene, under mild conditions.

The prepolymers (3) and (4) described above can be produced by methods known per se for producing prepolymers of diallyl phthalate. For example, the prepolymer (3) can be prepared by heating diallyl methylisophthalate and/or diallyl methylterephthalate in the presence or absence of a solvent and in the presence or absence of a free radical initiator. The reaction is stopped beore the gellation of the reaction mixture occurs, preferably when about 15–50% of the diallyl methylisophthalate and/or diallyl methylterephthalate has been consumed, and the unreacted material or residual solvent are separated from the reaction mixture.

The reaction temperature can be varied over a wide range according to the type of the free radical initiator or the presence or absence of the solvent and also its kind or amount, and is generally from 85 to 200° C. When a peroxide is used as the free radical initiator, it is convenient to use an organic solvent and perform the reaction at 105 to 120° C. under the conditions of total reflux.

The reaction pressure may be varied over a wide range, but preferably the reaction is carried out at atmospheric pressure.

The preferred solvents used in the above reaction are lower aliphatic alcohols having 1 to 5 carbon atoms, aromatic hydrocarbons such as benzene, toluene, xylene, ethylbenzene or isopropylbenzene, and lower aliphatic ketones such as acetone, methyl ethyl ketone or methyl isobutyl ketone. The reaction temperature is controlled by using a suitable amount of such a solvent, and the reaction system can be maintained uniform during polymerization. The free radical initiator may be an organic peroxide such as benzoyl peroxide, t-butyl hydroperoxide or t-butyl perbenzoate, an azo compound such as 2,2′-azobisisobutyronitrile or another substance having a similar effect. The amount of the free radical initiator is usually from 0.05 to 5% by weight based on the amount of the monomer.

The co-prepolymer (4) can be prepared by carrying out the above reaction of forming the homo- or co-prepolymer (3) in the copresence of a minor amount of a comonomer copolymerizable with the diallyl methylisophthalate or diallyl methylterephthalate. An example of the co-prepolymer (4) is a prepolymer composed of at least 80 mol percent, preferably at least 90 mol percent, of structural units derived from a monomer selected from diallyl methylisophthalate and diallyl methylterephthalate and not more than 20 mol percent, preferably not more than 10 mol percent, of structural units derived from an allyl ester of a mono- or polybasic acid other than said monomer.

Specific examples of the allyl ester of a mono- or polybasic acid are di- or tri-allyl esters of aromatic polybasic acids such as phthalic acid, isophthalic acid, terephthalic acid or trimellitic acid; polyallyl esters of aliphatic polybasic acids, such as maleic acid, fumaric acid or sebacic acid; allyl esters of mono-basic acids such as methacrylic acid or benzoic acid. Of these, diallyl isophthalate, diallyl terephthalate are especially preferred.

The homo- or co-prepolymers (3) and (4) are useful for laminating purposes. According to the present application, therefore, there can be provided a prepolymer of diallyl methylphthalate composed of at least 80 mol percent, preferably at least 90 mol percent, of structural units derived from a monomer selected from diallyl methylisophthalate and diallyl methyl terephthalate and not more than 20 mol percent, preferably not more than 10 mol percent, of structural units derived from an allyl ester of a mono- or poly-basic acid other than said monomer. This prepolymer is also a novel prepolymer, and can be used as a material for the production of the thermosetting diallyl methylphthalate of this invention, and also has valuable applications by itself.

The homo- or co-prepolymers (3) and (4) preferably have a number average molecular weight of about 3,000 to about 30,000. This prepolymer is a solid thermoplastic polymer containing residual unsaturated bonds. By further heating of the prepolymer, a thermosetting resin having cross-linkages can be easily produced.

The prepolymer, for example a prepolymer from diallyl-4-methyl isophthalate, has very good storage stability, and even when allowed to stand for six months at room temperature, it hardly changes in molecular weight or flow characteristics. Therefore, this is a very stable prepolymer which can provide a molding material of good flow characteristics.

In the present invention, the thermosetting diallyl methylphthalates can be produced by polymerizing or co-polymerizing at least one member selected from (1), (2), (3), and (4). The polymerization may be performed in the copresence of a comonomer copolymerizable with the member described.

Examples of such a comonomer include allyl esters of mono- or poly-basic acids other than the diallyl methylisophthalate and diallyl methyl terephthalate, vinyl compounds such as styrene, methyl methacrylate or glycidyl methacrylate, and 1,2-polybutadiene. Of course, diallyl isophthalate, diallyl terephthalate, 1,2-polybutadiene are especially preferred. The 1,2-polybutadiene is a polybutadiene in which the repeating units consist predominantly of 1,2-form units. Those having at least 60%, especially at least 80%, of 1,2-form units can be used preferably. The molecular weight of the polybutadiene is not critical in the present invention, but usually, those having a molecular weight of 500 to 10,000 (namely, ranging from a liquid to semi-liquid or solid) are used.

Preferably, the resulting thermosetting diallyl methylphthalate resin contains at least 60 mol percent of structural units derived from a monomer selected from the group consisting of diallyl methylisophthalate and diallyl methylterephthalate, based on the total amount of the resin. The more preferred content of these structural units is at least 70 mol percent, especially at least 80 mol percent, and in particular at least 90 mol percent.

The polymerization of the member selected from (1) to (4) is carried out by heating the reaction system. This reaction is a curing reaction, and can be performed, for example at 100–200° C., preferably 120–180° C., at atmospheric pressure or at an elevated pressure of not more than 700 kg./cm.$^2$.

In order to perform the final curing with good efficiency it is preferred to use a free radical initiator. An organic peroxide is preferred as the initiator. Examples of the organic peroxide are perbenzoic acid esters, benzoyl peroxide, dicumyl peroxide or t-butyl hydroperoxide.

The amount of the free radical initiator is usually from 0.5 to 5.0% by weight based on the total amount of the reactants.

Whenever required, an internal mold releasing agent, a filler, a coloring agent, a polymerization inhibitor, a reinforcing agent, a fire retardant or another additive can be used in this curing reaction. Examples of the mold releasing agent are lauric acid, stearic acid, calcium stearate, zinc stearate and silicone resins. Examples of the filler are calcium carbonate, silica, alumina and kaolinite. Examples of the coloring agent are carbon black, ceramic black, phthalocyanine blue and phthalocyanine green. Examples of the polymerization inhibitor are hydroquinone, tert.-butyl catechol and 2,5-ditert.butyl hydroquinone. Examples of the reinforcing agent are glass fibers, boron fibers, carbon fibers, asbestos fibers, pulp, polyester fibers, and polyacrylic fibers. Examples of the fire retardant include antimony oxide and tris (2,3-dibromopropyl) phosphate.

The thermosetting diallyl methylphthalate resins of this invention have especially superior thermal stability and chemical resistance as compared with the known diallyl phthalate resins. Usually, they show a heat stability index of at least 80% and a caustic resistance of at least 80%. This represents a marked improvement over the known diallyl phthalate resins which have a thermal stability of 65% at most and a caustic resistance of at most about 70%.

The thermosetting diallyl methylphthalate resins of this invention may be in the form of shaped articles or shaping resin compositions.

The heat stability index and caustic resistance of the resins were determined by the following methods.

THERMAL STABILITY (1) Preparation of test pieces

Rectangular pieces each 4 mm. thick, 10 mm. wide and 50 mm. long were cut out from the thermosetting resin, and used for the test.

(2) Test of thermal stability

An air-circulating heating device was set at 260° C., and the test pieces were kept therein for 10 hours with care taken not to bring the test pieces into contact with one another.

(3) Heat stability index

The weight (W) of the heated test pieces was determined, and the thermal stability was evaluated by the percent retention as against the weight ($W_0$) of the test pieces before heat-treatment.

The heat stability index (HSI) is as follows:

$$\text{HSI (percent)} = \frac{W}{W_0} \times 100$$

The HSI of the thermosetting resin is preferably at least 80% in view of its mechanical and electrical properties. If the thermosetting resin has a heat stability index of more than 90%, it has extremely good thermal stability.

CHEMICAL RESISTANCE (1) Preparation of test pieces

The same test pieces as used in the thermal stability test were used.

(2) 10 parts by weight of caustic soda solution was dissolved in 90 parts by weight of pure water to prepare a 10% aqueous solution.

(3) Chemical resistance test

Each of the test piece was immersed in the 10% aqueous caustic soda solution prepared above in an amount corresponding to 10 volume/weight times the amount of the test piece, and placed in a constant temperature oil bath maintained at 100° C. for 50 hours.

(4) Measurement of hardness and caustic resistance

Each of the test piece was then washed with flowing water for 30 minutes to wipe off water adsorbed thereto using a cotton cloth. The test piece was then maintained at a constant temperature of 25° C. and a relative humidity of 60% for 10 minutes. Immediately then the Barcol hardness of the specimen was measured using Impressor No. 935 (Barber-Colman Company).

The chemical resistance (alkali resistance) of the test piece was evaluated by the ratio of the Barcol hardness (H) of the treated test piece to the Barcol hardness ($H_0$) of the test piece before treatment with caustic soda.

That is to say, the caustic resistance (CR) was calulated by the following equation.

$$\text{CR (percent)} = \frac{H}{H_0} \times 100$$

The caustic resistance is preferably more than 80%. If the test piece has a caustic resistance of more than 90%, it is judged to have extremely good resistance to alkali.

The following Examples are given to illustrate the present invention. All parts are by weight unless otherwise specified.

EXAMPLE 1

Preparation of Prepolymers

I-A: A mixture of 100 parts of diallyl 4-methylisophthalate having a boiling point of 129–131° C. at 1.5 mm. Hg and 0.22 part of benzoyl peroxide was heated from room temperature to 110° C. in the course of one hour with stirring in an atmosphere of nitrogen. The reaction was performed for 4 hours at 110° C.±1° C. The reaction mixture was then cooled to 30° C., and the stirring was stopped. The reaction mixture having a viscosity at 25° C. of 410 centipoises was withdrawn, and poured into about 5 times its volume of methanol. The unreacted monomer and the remaining free radical initiator moved to methanol, and the resulting prepolymer was precipitated. Fresh methanol was added to the precipitate, and the mixture was stirred thoroughly, The separated solid was pulverized and dried to form 29 parts of a prepolymer of diallyl 4-methylisophthalate. This prepolymer was in the form of white powders having an iodine value of 76 and a number average molecular weight of 9000.

I-B: A mixture of 100 parts of diallyl methylterephthalate having a boiling point of 129–130° C. at 1.5 mm. Hg, 35 parts of sec.-butyl alcohol and 2.5 parts of benzoyl peroxide was heated to 100° C. for 2 hours in an atmosphere of nitrogen with stirring. The reaction mixture was then cooled to 30° C., and the stirring was stopped. The reaction mixture having a viscosity at 25° C. of 280 centipoises was withdrawn, and poured into about 5 times its volume of methanol with stirring. The unreacted monomer, sec.-butyl alcohol, and the remaining free radical initiator were moved to methanol, and the resulting prepolymer was precipitated. This precipitate was washed with methanol and dried to yield 44 parts of a prepolymer of diallyl methylterephthalate. This prepolymer was in the form of white powders having an iodine value of 69 and a number average molecular weight of 6700.

I-C: Diallyl 4-methylisophthalate (30 parts), 70 parts of of diallyl methylterephthalte, 1.2 parts of benzoyl peroxide and 100 parts of n-propanol were mixed with one another, and heated for 5 hours at a total reflux temperature (98 to 100° C.) while stirring in an atmosphere of nitrogen. The reaction mixture was cooled to room temperature, and allowed to stand for about 5 hours. The white highly viscous layer that separated down to the bottom was dissolved in 25 parts of acetone, and the resulting solution was poured into 10 times its volume of methanol to precipitate a prepolymer. The product was thoroughly washed, separated, and dried to form white powder of the prepolymer having a softening point of 65 to 90° C., an iodine value of 67 and a number average molecular weight of 7100 in a yield of 32%. Gas-chromatographic analysis of all the monomers recovered showed that the composition of the monomeric units in the prepolymer substantially corresponded with that of the monomers used.

I-D: Diallyl 4-methylisophthalate (40 parts), 60 parts of diallyl methylterephthalate, 1.2 parts of benzoyl peroxide and 100 parts of n-propanol were mixed with one another, and heated for 3 hours at a total reflux temperature (98–100° C.) with stirring in an atmosphere of nitrogen. The reaction mixture was cooled to room temperature, and the white highly viscous layer that separated down to the bottom was dissolved in 25 parts of acetone, and the resulting solution was poured into about 10 times its volume of methanol to precipitate a prepolymer. The product was washed and dried to form a white solid having a softening point of 50 to 90° C., an iodine value of 60 and a number average molecular weight of 5900 in a yield of 24%.

I-E: Diallyl 4-methylisophthate (50 parts), 50 parts of diallyl methylterephthalate, 1.5 parts of benzoyl peroxide and 100 parts of methyl ethyl ketone were mixed with one another. With vigorous stirring, the mixture was heated for 7.5 hours at a total reflux temperature (79.5–81.5° C.). The reaction mixture was then cooled to room temperature, and poured into five times its volume of methanol to precipitate a prepolymer. The product was thoroughly washed with fresh methanol, and dried to form 40 parts of white powders of the prepolymer having an iodine value of 77 and a number average molecular weight of 5600.

I-F: A mixture of 70 parts of diallyl 4-methylisophthalate, 25 parts of diallyl methylterephthalate, 5 parts of diallyl maleate having a boiling point of 93.7° C. at 1 mm. Hg, and 0.1 part of benzoyl peroxide was heated from room temperature to 100° C.. in the course of one hour with stirring in an atmosphere of nitrogen. During this time, additional 0.1 part of benzoyl peroxide was added little by little. The mixture was then reacted at a temperature of 100±1.0° C. for 5 hours. The mixture was then cooled to 30° C., and the stirring was stopped. A colorless transparent reaction mixture having a viscosity at 30° C. of 270 centipoises was withdrawn and poured into 2 times its volume of methanol. The resulting mixture was heated to 55 to 60° C., and the prepolymer layer which became flowable was stirred, followed by extracting methanol-soluble substances other than the prepolymer. The supernatant liquid was removed, and fresh methanol was used first in an amount 2 times the volume of the prepolymer layer and finally in an amount equal to the prepolymer in order to remove the methanol-soluble substances by extraction. The prepolymer layer was cooled, solidified, pulverized, and dried at room temperature under reduced pressure. A prepolymer having an iodine value of 69 and a number average molecular weight of 7800 was obtained at a conversion of 26%. From the nuclear magnetic resonance spectrum of the prepolymer, its alkali hydrolysis and the gas-chromatographic analysis of substances other than the recovered prepolymer, it was confirmed that the composition of the monomeric units in the prepolymer substantially corresponded with diallyl 4-methylisophthalate:diallyl methylterephthalate:diallyl maleate=60:20:20.

I-G: A mixture of 95 parts of diallyl 4-methylisophthalate, 5 parts of allyl benzoate and 0.3 part of tert. butyl perbenzoate was heated from room temperature to 130° C. in the course of 2 hours with stirring in an atmosphere of nitrogen, and then reacted at a temperature of 130+1.0° C. for 4 hours. The reaction mixture was then cooled to room temperature, and the reaction mixture together with about 5 times its volume of methanol was fed by a pump to a colloid mill (the clearance between the rotary body and the fixed body 0.01 inch, speed 3600 r.p.m., flow rate of 757 liters/hr.). The mixture was cooled to 5° C., and the solid substance was recovered by filtration. It was washed with cold methanol, and dried at reduced pressure at room temperature. From the $D_{1645}/D_{1600}$ ratio (the ratio of adsorbance at 1645 cm.$^{-1}$ to that at 1600 cm.$^{-1}$) of the infrared absorption spectrum, it was confirmed that the resulting white powdery prepolymer contained about 35%, based on the monomers, of unsaturated bonds. The results of its alkali hydrolysis showed that the composition of the monomeric units of the prepolymer was diallyl 4-methylisophthalate: allyl benzoate=97:3. The number molecular weight of the prepolymer was 7600, and the conversion was 26%.

I-H: A mixture of 90 parts of diallyl methylterephthalate, 10 parts of diallyl phthalate, 1.3 parts of benzoyl peroxide and 100 parts of isopropanol was heated for 6 hours at a total reflux temperature (82.5 to 84.3° C.) with stirring in an atmosphere of nitrogen. The reaction mixture was then cooled to 60° C., and was then poured into 300 parts of methanol heated at 45° C. with vigorous stirring. The precipitate formed was washed, dried, and dissolved in 30 parts of acetone. The resulting solution was poured into 200 parts of methanol heated at 45° C. and vigorously stirred. The precipitate formed was thoroughly washed with methanol, recovered by filtration and dried to yield a white powdery prepolymer having a softening point of 70 to 105° C. and a number average molecular weight of 10,800 in a yield of 29%. It was confirmed from the $D_{1645}/D_{1600}$ ratio that the prepolymer obtained contained 40%, based on the monomers, of unsaturated bonds, and from the results of alkali hydrolysis the composition of the monomeric units in the prepolymer was about 80:20 (=diallyl methyl terephthalate:diallyl phthalate).

I-I: The prepolymer of diallyl phthalate used in the following Examples and Comparative Examples had an iodine value of 50 and a number average molecular weight of 14,000.

I-J: The prepolymer of diallyl isophthalate used in the following Examples and Comparative Examples had an iodine value of 65 and a number average molecular weight of 11,000.

EXAMPLE II

Preparation of Cured Resins Using Prepolymer (1) 95 parts of the prepolymer prepared in Example I-A, 5 parts of diallyl 4-methylisophthalate, 2 parts of dicumyl peroxide and 300 parts of acetone were mixed in a kneader, and then kneaded with a roller heated at 100° C. The mixture was then dried for 12 hours to form a molding material.

The molding material was maintained for 10 minutes at 150 kg./cm.$^2$ in a mold heated at 170° C. to form a cured product.

(2) 95 parts of the prepolymer prepared in Example I-B, 5 parts of diallyl methylterephthalate and 2 parts of dicumyl peroxide and 300 parts of acetone were mixed in the same way as in Example II-(1) to form a molding material. The material was cured in the same way as mentioned in (1) above.

(3) to (5) In quite the same way as in Example II-(1), cured products shown in Table I were prepared using the prepolymer prepared in Examples I-C, I-D and I-E, respectively.

(6) For comparison, the procedure of Example II-(1) was repeated except that diallyl phthalate and the prepolymer derived from diallyl phthalate shown in Example I-(1) were used instead of diallyl 4-methylisophthalate and the prepolymer derived from diallyl 4-methylisophthalate in Example II-(1).

(7) In quite the same way as in (1), except that diallyl isophthalate and the prepolymer derived from diallyl isophthalate shown in Example I-J were used instead of diallyl 4-methylisophthalate and the prepolymer derived from diallyl 4-methylisophthalate used in Example II-(1), respectively.

The heat stability indices and the caustic resistances of the cured products obtained in Examples (1) to (7) were measured, and the results shown in Table I below were obtained.

TABLE 1

| Example number | Monomer contents of the cured product (mol. percent) | | Contents of components other than the monomers in the preceding column (mol. percent) | Heat stability index (percent) | Caustic resistance (percent) |
| --- | --- | --- | --- | --- | --- |
| | Diallyl 4-methyl-isophthal-ate | Diallyl methyl-tereph-thalate | | | |
| 1 | 100 | | | 98 | 94 |
| 2 | | 100 | | 96 | 89 |
| 3 | 30 | 70 | | 97 | 90 |
| 4 | 40 | 60 | | 97 | 90 |
| 5 | 50 | 50 | | 97 | 91 |
| 6 (comparison) | | | 100 (diallylphthalate) | 64 | 69 |
| 7 (comparison) | | | 100 (diallylisophthalate) | 94 | 86 |

When the heat stability indices shown in Table 1 were measured after treatment for longer periods of time, the results shown in Table 2 were obtained. It was therefore confirmed that the cured resins of this invention have very superior thermal stability to those of comparisons.

TABLE 2

| Resin | $W/W_0 \times 100$ (percent) | |
|---|---|---|
| | 10 hours | 100 hours |
| No. 1 of Table 1 | 98 | 94 |
| No. 6 of Table 1 | 64 | <50 |
| No. 7 of Table 1 | 94 | 79 |

Other properties of the cured resins obtained in No. 1, No. 6 and No. 7 shown in Table 2 were measured, and the results are shown in Table 3.

TABLE 3

| Properties | Resin | | |
|---|---|---|---|
| | No. 1 | No. 6 (comparison) | No. 7 (comparison) |
| Temperature at which a decrease in weight begins (° C.) | 311 | 276 | 303 |
| Heat distortion temperature (° C.) | 260 | 160 | 238 |
| Barcol hardness | 46 | 43 | 45 |
| Pencil hardness | 7H | 5H | 7H |
| Volume resistivity ($\Omega$ cm.) | $3.1 \times 10^{16}$ | $9.0 \times 10^{16}$ | $6.0 \times 10^{16}$ |
| Surface resistivity ($\Omega$) | $4.7 \times 10^{14}$ | $2.2 \times 10^{13}$ | $8.0 \times 10^{16}$ |
| Dielectric constant | 3.0 | 3.2 | 3.0 |
| Dielectric loss (tan $\delta$) | 0.021 | 0.022 | 0.021 |
| Resistance to arc (second) | 129 | 126 | 128 |

It is confirmed therefore that the cured resin derived from diallyl 4-methylisophthalate has excellent electrical properties and surface hardness.

Each of the diallyl 4-methylisophthalate prepolymer described in Example I-A and the diallyl isophthalate prepolymer described in Example I-J was treated at 50° C. One gram each of these prepolymers was set in a flow tester held at 100° C., and under a pressure of 100 kg./cm.², the speed of displacement of the plunger of the flow tester [amount of displacement (mm.)/min.] was measured. The percentage of the speed of displacement based on that of the prepolymer before the above-mentioned treatment was calculated. The results are shown in Table 4.

TABLE 4

| Treating conditions | Prepolymer | |
|---|---|---|
| | Diallyl 4-methylisophthalate | Diallyl isophthalate |
| 50° C., 24 hours, percent | 95.9 | 93.5 |
| 50° C., 72 hours, percent | 80.0 | 60.9 |
| 50° C., 120 hours, percent | 62.0 | 28.3 |

It is seen from the results obtained above that while the flow characteristics of the diallyl isophthalate prepolymer become very poor as a result of heat-treatment, the flow characteristics of the diallyl 4-methylisophthalate prepolymer hardly change, and therefore that the latter is a very stable prepolymer.

EXAMPLE III

Preparation of Cured Resins Using Monomers Only (8) A uniform solution consisting of 50 parts of diallyl 4-methylisophthalate, 50 parts of diallyl methylterephthalate, 1 part of benzoyl peroxide and 2 parts of dicumyl peroxide was charged into a casting mold which was formed between two opposing glass plates disposed at a distance of 4 mm. and which contained four glass cloths, and impregnated into the glass cloths. Thereafter, the casting mold was heated from 80° C. to 160° C. at a rate of 0.3° C./min. to form a cured product.

The cured product had a flexural strength of 22.5 kg./mm.² and a flexural modulus of 805 kg./mm.². It was a tough glass-reinforced cured resin plate.

(9) to (11) Glass-reinforced cured resin plates (glass content 50% by weight) of the compositions shown in Table 5 were produced in quite the same way using various proportions of monomers. The heat stability index and caustic resistance of each of the resin plates obtained were measured, and the results are shown in Table 5. It is seen from the results obtained that the cured resins according to the present invention have very superior thermal stability and chemical resistance.

TABLE 5

| Example | Monomer contents in the cured resin (mol. percent) | | Content of other monomer in the cured resin (mol. percent) | Heat stability (percent) | Caustic resistance (percent) |
|---|---|---|---|---|---|
| | Diallyl 4-methyl-isophthalate | Diallyl methyl-terephthalate | | | |
| 8 | 50 | 50 | | 95 | 88 |
| 9 | 100 | | | 96 | 90 |
| 10 | | 95 | 5 (glycidyl methacrylate) | 93 | 87 |
| 11 (comparison) | | | 100 (diallyl phthalate) | 59 | 66 |

EXAMPLE IV

(12) A uniform viscous solution having a viscosity at 25° C. of 4200 centipoises and consisting of 40 parts of the prepolymer derived from diallyl 4-methylisophthalate prepared in Example I-A, 60 parts of diallyl 4-methylisophthalate and 2 parts of tertiary butyl perbenzoate was poured into a casting mold formed between two glass plates disposed at a distance of 4 mm. After degassing, the casting mold was heated from 80° C. to 160° C. at a rate of 0.25° C./min. to form a colorless transparent cured resin.

(13) to (15) Cured resins of the composition shown in Table 6 were obtained in quite the same way. The heat stability index and caustic resistance of each of these cured resins, as shown in Table 6, were extremely superior.

TABLE 6

| Example | Monomer contents in the cured product (mol. percent) | | Content of other monomer in the cured resin (mol. percent) | Heat stability index (percent) | Caustic resistance (percent) |
|---|---|---|---|---|---|
| | Diallyl 4-methyl-isophthalate | Diallyl methyl-terephthalate | | | |
| 12 | 100 | | | 96 | 90 |
| 13 | 35 | 50 | 15 (diallyl isophthalate) | 95 | 98 |
| 14 | 40 | 40 | 20 (1,2-polybutadiene having molecular weight 2,000, liquid) | 98 | 91 |
| 15 | 95 | | 5 (styrene) | 86 | 88 |

EXAMPLE V

(16) 95.3 parts of the prepolymer prepared from diallyl methylterephthalate in Example I-B, 4.7 parts of diallyl isophthalate and 2 parts of dicumyl peroxide were mixed in a kneader. The mixture obtained was heated for 15 minutes at 150° C. and 500 kg./cm.$^2$, and further maintained at 115° C. for 10 hours to complete its curing.

(17) A cured resin having the composition shown in Table 7 was produced in the same way as in (16) above using the precopolymer obtained in Example I-F (diallyl 4-methylisophthalate/diallyl methylterephthalate/diallyl maleate=60/20/20).

(18) A cured resin having the composition shown in Table 7 was produced in the same way as in (16) above using the precopolymer obtained in Example I-G (diallyl 4-methylisophthalate/allyl benzoate=93/7).

(19) A cured resin having the composition shown in Table 7 was produced in the same way as in (16) above using the precopolymer prepared in Example I-H (diallyl methylterephthalate/diallyl phthalate=80/20).

(20) A cured resin having the composition shown in Table 7 was produced in the same way as in (16) above using the precopolymer (diallyl 4-methylisophthalate/diallyl-methylterephthalate=40/60) obtained in Example I-D, the prepolymer from diallyl isophthalate described in Example I-J and triallyl trimellitate.

The heat stability index and caustic resistance of each of the cured resins obtained above are shown in Table 7. It is seen from these data that the cured resins according to the present invention exhibit extremely good thermal resistance and resistance to alkali.

What is claimed is:

1. A thermoset diallyl methylphthalate cured resin comprising at least 70 mol percent of structural units derived from a monomer selected from the group consisting of diallyl methylisophthalate and diallyl methylterephthalate and not more than 30 mol percent of structural units derived from a compound selected from the group consisting of 1,2-polybutadiene, vinyl compounds, and allyl esters of mono- or poly-basic acids other than said monomers.

2. The resin of claim 1 which has a heat stability index of at least 80%.

3. The resin of claim 1 which has a caustic resistance of at least 80%.

4. The resin of claim 1 wherein said allyl ester of mono- or poly-basic acid is selected from the group consisting of allyl methacrylate, allyl benzoate, diallyl phthalate, diallyl isophthalate, diallyl terephthalate and triallyl trimellitate.

5. The resin of claim 1 wherein said vinyl compound is selected from the group consisting of styrene, methyl methacrylate and glycidyl methacrylate.

6. The resin of claim 1 wherein the structural unit derived from said monomer is at least 80 mol percent.

7. A diallyl methylphthalate prepolymer comprising at least 80 mol percent of structural units derived from a monomer selected from the group consisting of diallyl methyl isophthalate and diallyl methylterephthalate and not more than 20 mol percent of structural units derived from an allyl ester of a mono- or poly-basic acid other than diallyl methylisophthalate and diallyl methylterephthalate.

8. The prepolymer of claim 7 wherein said prepolymer has a number average molecular weight of about 3000 to 30,000.

9. The resin of claim 1 which is in the form of a shaped article.

TABLE 7

| Example | Monomer contents of the cured resin (mol. percent) | | Contents of other monomers (mol. percent) | Heat stability index (percent) | Caustic resistance (percent) |
|---|---|---|---|---|---|
| | Diallyl 4-methyl-isophthalate | Diallyl methyl-terephthalate | | | |
| 16 | | 95 | 5 (diallyl isophthalate) | 95 | 90 |
| 17 | 95 | | 5 (diallyl maleate) | 89 | 83 |
| 18 | 37 | 60 | 3 (allyl benzoate) | 88 | 84 |
| 19 | | 92 | 8 (diallyl phthalate) | 86 | 83 |
| 20 | 35 | 50 | {10 (diallyl isophthalate) / 5 (triallyl trimellitate)} | 94 | 89 |

References Cited

UNITED STATES PATENTS

| | | | |
|---|---|---|---|
| 2,501,610 | 3/1950 | Morris et al. | 260—78.4 |
| 3,390,116 | 6/1968 | Porret | 260—32.8 |
| 3,326,966 | 6/1967 | Renckhoff et al. | 260—475 |
| 2,445,627 | 7/1948 | Morris et al. | 260—468 |
| 2,578,312 | 12/1951 | Miller et al | 260—475 |
| 2,433,616 | 12/1947 | Marple et al. | 260—78.4 |

JOSEPH L. SCHOFER, Primary Examiner

J. KIGHT, Assistant Examiner

U.S. Cl. X.R.

260—78.4 UA, D, 873

UNITED STATES PATENT OFFICE
CERTIFICATE OF CORRECTION

Patent No. 3,840,502     Dated  October 8, 1974

Inventor(s)    KIYOKAZU TSUNAWAKI ET AL

It is certified that error appears in the above-identified patent and that said Letters Patent are hereby corrected as shown below:

In the Heading, insert patentees' Foreign Application Priority Information as follows:

-- Japanese Application No. 46-81151/71, filed October 14, 1971
   Japanese Application No. 47-56804/72, filed June 9, 1972. --

Signed and sealed this 7th day of January 1975.

(SEAL)
Attest:

McCOY M. GIBSON JR.
Attesting Officer

C. MARSHALL DANN
Commissioner of Patents